United States Patent
Cropper et al.

(10) Patent No.: US 9,619,293 B1
(45) Date of Patent: *Apr. 11, 2017

(54) EVENT RESPONSE FOR A SHARED POOL OF CONFIGURABLE COMPUTING RESOURCES WHICH USES A SET OF DYNAMICALLY-ASSIGNED RESOURCES

(71) Applicant: International Business Machines Corporation, Armonk, NY (US)

(72) Inventors: Joseph W. Cropper, Rochester, MN (US); Jennifer D. Mulsow, Cedar Park, TX (US); Taylor D. Peoples, Austin, TX (US); Jeffrey W. Tenner, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,699

(22) Filed: Jan. 3, 2016

Related U.S. Application Data

(63) Continuation of application No. 14/922,082, filed on Oct. 23, 2015.

(51) Int. Cl.
*G06F 13/00* (2006.01)
*G06F 9/50* (2006.01)
*G06F 9/455* (2006.01)

(52) U.S. Cl.
CPC ........ *G06F 9/5077* (2013.01); *G06F 9/45558* (2013.01); *G06F 2009/4557* (2013.01)

(58) Field of Classification Search
CPC ............................ G06F 9/45533; G06F 9/542
USPC .............................................. 718/1; 719/318
See application file for complete search history.

(56) References Cited

U.S. PATENT DOCUMENTS

| | | | |
|---|---|---|---|
| 8,347,307 B2 | 1/2013 | Dawson et al. | |
| 8,751,650 B2 * | 6/2014 | Mittal | H04L 63/101 709/225 |
| 9,037,723 B2 | 5/2015 | Morgan | |
| 9,075,657 B2 | 7/2015 | Jackson | |
| 2014/0137110 A1 * | 5/2014 | Engle | G06F 9/5022 718/1 |
| 2015/0212840 A1 | 7/2015 | Biran et al. | |

(Continued)

OTHER PUBLICATIONS

Mell, Peter, et al., The NIST Definition of Cloud Computing, National Institute of Standards and Technology, Oct. 7, 2009, Version 15, NIST, Gaithersburg, MD, US.

(Continued)

*Primary Examiner* — Andy Ho
(74) *Attorney, Agent, or Firm* — Kevin Kehe

(57) ABSTRACT

Disclosed aspects manage a shared pool of configurable computing resources. A triggering event is detected. The triggering event may be related to a resource utilization on a host of the shared pool of configurable computing resources. Based on a set of profile data, it is determined to perform an event response. The event response includes initiating a resource action or initiating an asset action. The resource action may include distributing a set of dynamically-assigned resources. The asset action corresponds to a set of assets (e.g., migrating a set of virtual machines). To change the resource utilization on the host, the event response is performed.

15 Claims, 5 Drawing Sheets

(56) References Cited

U.S. PATENT DOCUMENTS

2016/0179582 A1* 6/2016 Skerry ............... G06F 9/5077
718/1

OTHER PUBLICATIONS

IBM, Power Enterprise Pool, <http://www-01.ibm.com/support/knowledgecenter/P8ESS/p8ha2/systempool_cod.htm>.
Hewlett-Packard, Instant Capacity on Demand, <http://h20223.www2.hp.com/nonstopcomputing/cache/77296-0-0-0-121.html>.
Zhang, Wei, et al., "Performance Degradation-aware Virtual Machine Live Migration in Virtualized Servers", Parallel and Distributed Computing, Applications and Technologies (PDCAT), 2012 13th International Conference.
Cropper et al., "Event Response for a Shared Pool of Configurable Computing Resources Which Uses a Set of Dynamically-Assigned Resources", U.S. Appl. No. 14/922,082, filed Oct. 23, 2015.
List of IBM Patents or Patent Applications Treated as Related.

\* cited by examiner

EVENT RESPONSE FOR A SHARED POOL OF CONFIGURABLE COMPUTING RESOURCES WHICH USES A SET OF DYNAMICALLY-ASSIGNED RESOURCES

BACKGROUND

This disclosure relates generally to computer systems and, more particularly, relates to managing a shared pool of configurable computing resources which uses a set of dynamically-assigned resources. The amount of data that needs to be managed by enterprises is increasing. Management of a shared pool of configurable computing resources may be desired to be performed as efficiently as possible. As data needing to be managed increases, the need for management efficiency may increase.

SUMMARY

Aspects of the disclosure are used to manage a shared pool of configurable computing resources which uses a set of dynamically-assigned resources with respect to capacity-on-demand technology. A triggering event is detected. The triggering event may be related to a resource utilization on a host of the shared pool of configurable computing resources. Based on a set of profile data, it is determined to perform an event response. The event response includes initiating a resource action or initiating an asset action. The resource action may include distributing a set of dynamically-assigned resources. The asset action corresponds to a set of assets (e.g., migrating a set of virtual machines). To change the resource utilization on the host, the event response is performed.

Aspects of the disclosure include using capacity-on-demand technology or live migration to resolve/balance resource utilization by, for example, considering relevant policies which may be administrator/user-defined. Elements can include a selection of an appropriate action to achieve a threshold resource utilization via mobile resource distribution/activation, virtual machine live migration, or both—based on policies made available to a manager/scheduler. Efficient usage of capacity-on-demand resources can provide performance benefits such as high availability, for example.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
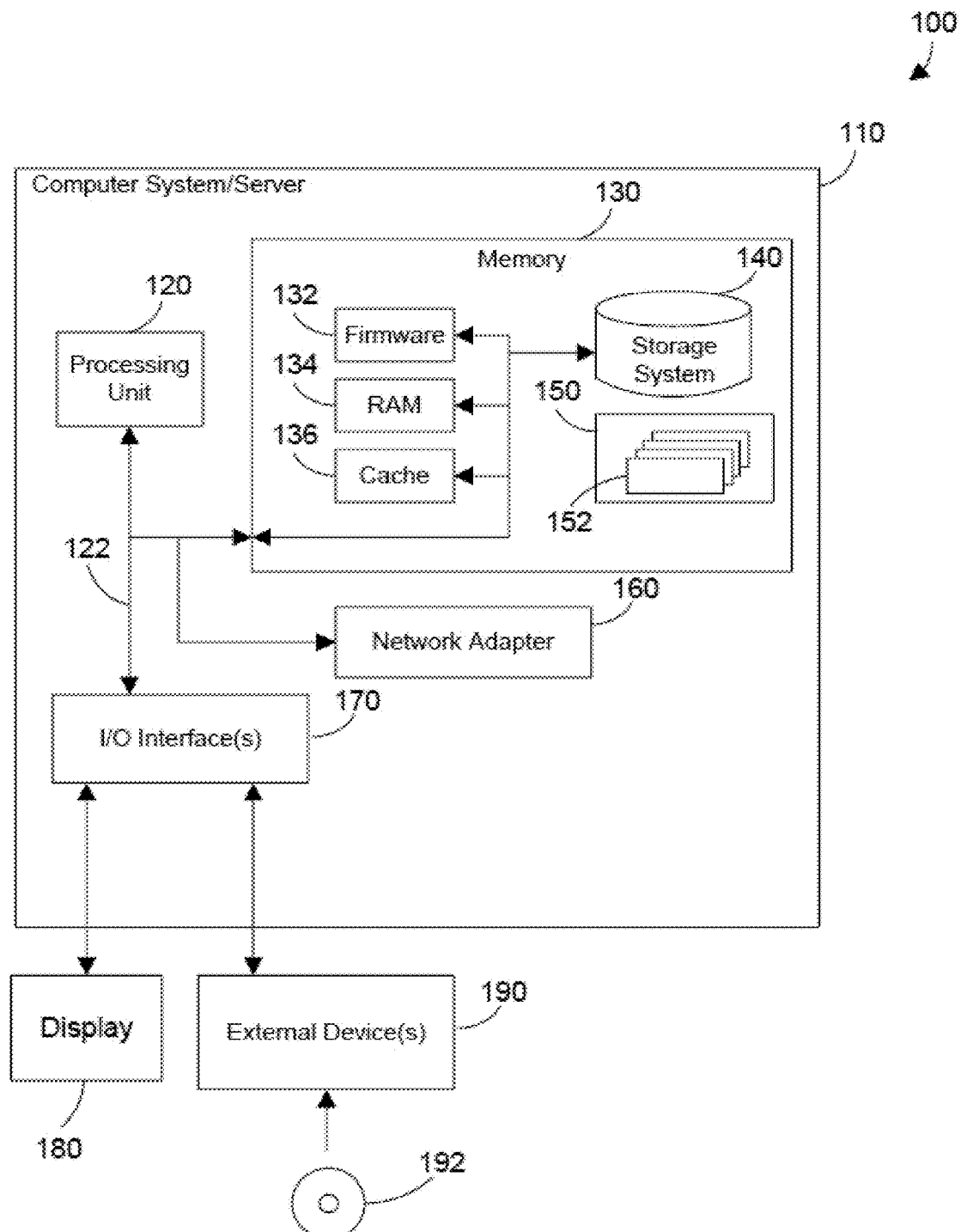
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to capacity-on-demand technology which allows compute servers to have compute resources (e.g., processors, memory) dynamically assigned/activated (e.g., to make efficient use of licenses). Aspects include using capacity-on-demand technology or live migration to resolve/balance resource utilization based on a set of profile data (e.g., considering relevant policies which may be administrator/user-defined). Elements can include a selection of an appropriate action to achieve a threshold resource utilization via mobile resource distribution/activation, virtual machine live migration (e.g., which may have burdens such as taking a temporal period such as 10-20 minutes to complete), or both—based on policies (e.g., in the set of profile data, associated with workload characteristics) made available to a manager/scheduler. Capacity-on-demand resources can be expensive for customers and efficient usage of such resources can provide performance benefits such as high availability, for example.

Aspects of the disclosure include a method, system, and computer program product for managing a shared pool of configurable computing resources. A triggering event is detected. The triggering event may be related to a resource utilization on a host of the shared pool of configurable computing resources. Based on a set of profile data, it is determined to perform an event response. The event response includes initiating a resource action or initiating an asset action. The resource action may include distributing a set of dynamically-assigned resources. The asset action corresponds to a set of assets (e.g., migrating a set of virtual machines). To change the resource utilization on the host, the event response is performed.

In various embodiments, determining to perform the event response based on the set of profile data includes selecting the resource action in response to the set of profile data indicating a first parameter value for a parameter, and selecting the asset action in response to the set of profile data indicating a second parameter value for the parameter. In embodiments, the set of profile data includes a selection from a group consisting of at least one of: a temporal factor, a physical location factor, an unassigned resource availability factor, an assigned resource availability factor, a weighted resource availability factor, an asset priority factor, an expected performance factor, a historical usage factor, or a user-provided factor. In certain embodiments, the set of profile data includes both a set of user input data and a set of computing environment data.

For example, determining to perform the event response based on the set of profile data can include various operations. In response to the set of profile data indicating to avoid use of the set of dynamically-assigned resources during the temporal period, the asset action may be selected. The resource action may be selected: in response to the set of profile data indicating to avoid a virtual machine migration during the temporal period, in response to the set of profile data indicating to avoid a virtual machine migration from the host, in response to the set of profile data indicating to avoid a virtual machine migration of the virtual machine from the host, in response to the set of profile data indicating an unassigned resource value exceeds a threshold unassigned resource value, in response to the set of profile data indicating an assigned resource value exceeds a target resource value for the donor host, or in response to the set of profile data indicating an expected burden of executing the asset action exceeds an expected burden of executing the resource action. Altogether, performance or efficiency benefits when managing a shared pool of configurable computing resources which uses a set of dynamically-assigned resources may occur (e.g., speed, flexibility, responsiveness, load balancing, availability, resource usage, productivity). Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
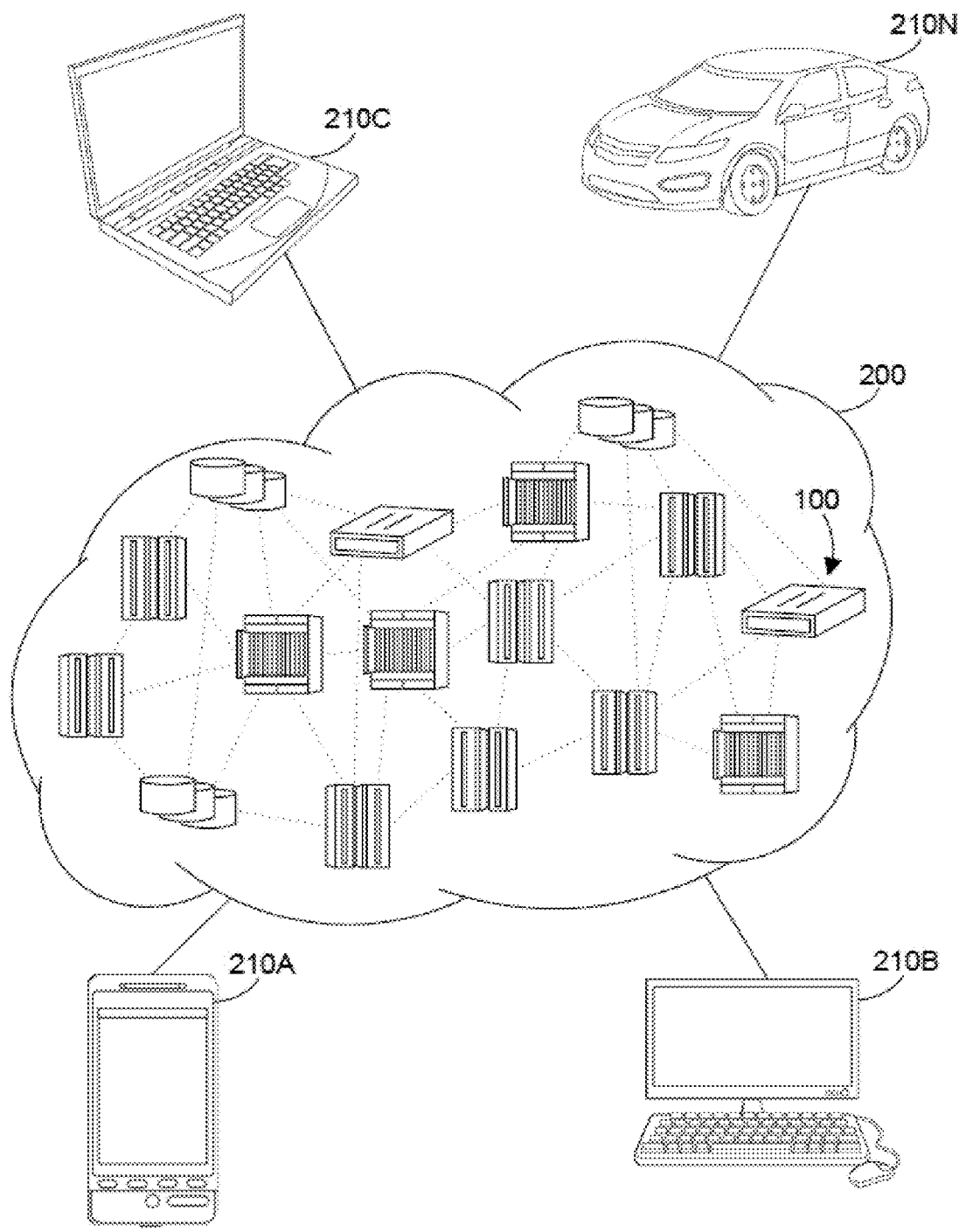
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
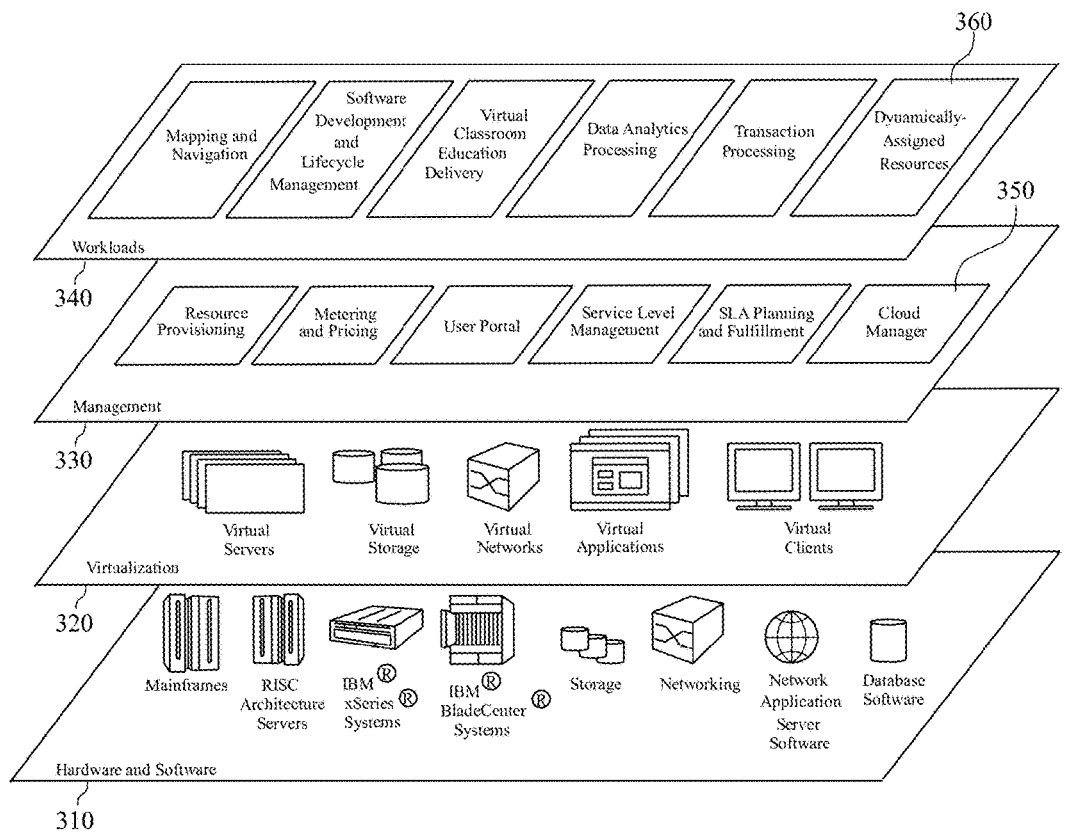
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a set of dynamically-assigned resources 360, which may be used as discussed in more detail below.

Figure 4:
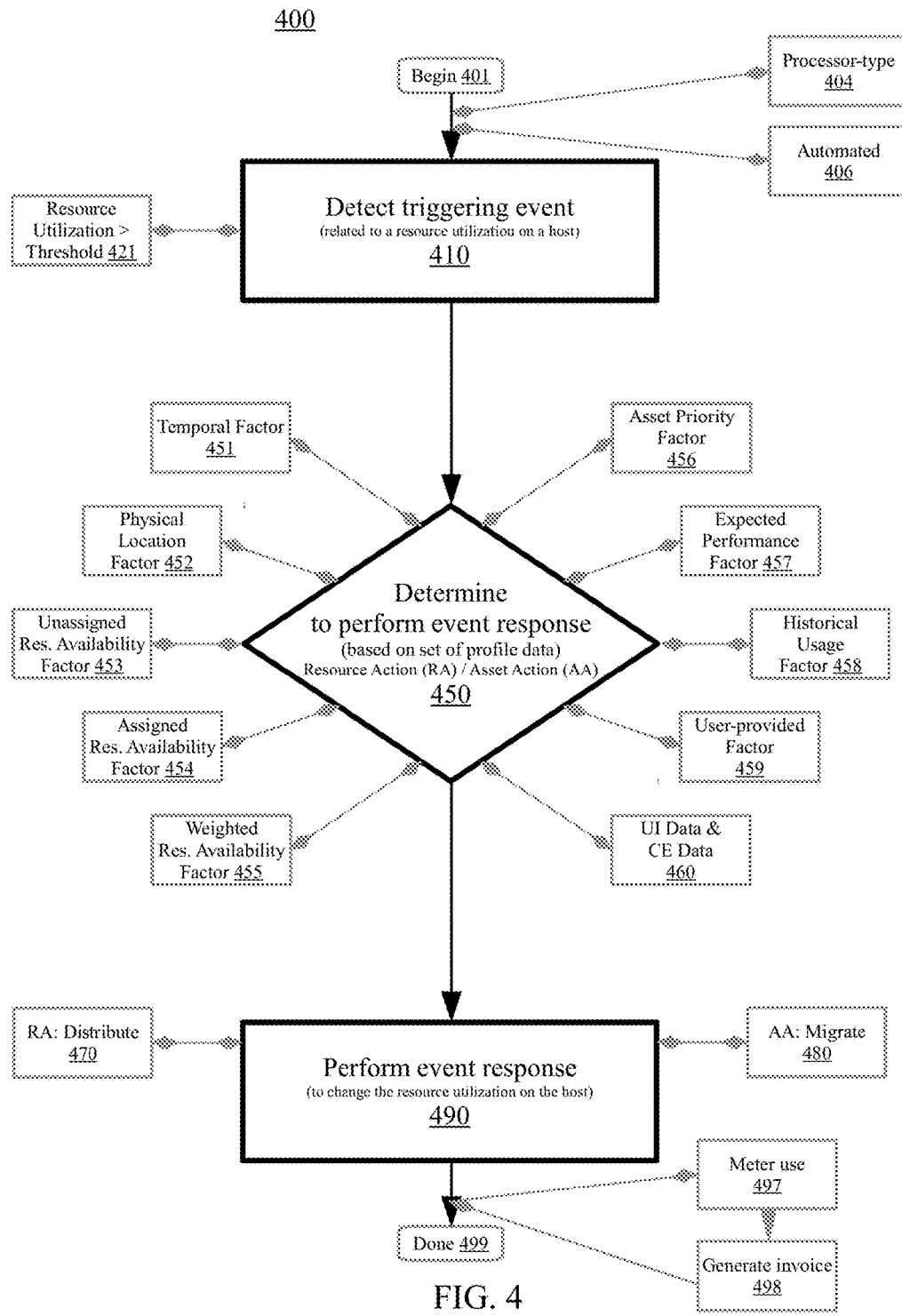
FIG. 4 is a flowchart illustrating a method for managing a shared pool of configurable computing resources which uses a set of dynamically-assigned resources with respect to capacity-on-demand technology according to embodiments.

FIG. 4 is a flowchart illustrating a method 400 for managing a shared pool of configurable computing resources which uses a set of dynamically-assigned resources with respect to capacity-on-demand technology according to embodiments. The shared pool of configurable computing resources may utilize a shared pool manager (e.g., a controller, a cloud manager) to execute/carry-out processes/tasks. The shared pool manager may or may not be included in the shared pool of configurable computing resources.

Capacity-on-demand technology can allow compute servers to have compute resources (e.g., processors, memory) dynamically assigned/activated (to make efficient use of licenses/costs). Capacity-on-demand technology can include built-in hardware resources which can be switched on online and without an interrupt either temporarily or permanently. The set of dynamically-assigned resources (e.g., processors, memory) may be referred to as mobile resources (e.g., non-dedicated resource licenses) which can be allocated to various hosts in response to a triggering event (e.g., as needed/desired/requested). Method 400 may begin at block 401.

In embodiments, an x86 processor is absent with respect to the set of dynamically-assigned resources at block 404. x86 processors may utilize software hypervisors for virtualization. x86 processors can have additional layers with respect to non-x86 processors. In certain embodiments, support for a hypervisor is built into the chip (e.g., embedded firmware managing the processor and memory resources). Accordingly, the hypervisor may run as a piece of firmware code interacting with the hardware and virtual machines.

In embodiments, a resource manager may be used at block 406 to manage a set of operations in an automated fashion without user intervention as described herein (e.g., detecting a triggering event, determining to perform an event response based on a set of profile data, performing the event response). The resource manager may be included in the shared pool manager, or may be separate. As such, the resource manager can manage capacity-on-demand resources such as the set of dynamically-assigned resources (e.g., mobile/floating processors, mobile/floating memory).

At block 410, a triggering event is detected. The triggering event may be related to a resource utilization (e.g., amount of processing/memory capability being used, 80%, 20 cores, 16 gigabytes) on a host of the shared pool of configurable computing resources. Detection may occur using a monitoring application or service, and may collect or scan a set of statistics. In embodiments, the triggering event includes the resource utilization exceeding a threshold resource utilization (e.g., using 90% of memory capacity when the threshold is 80%, using 100 cores when the threshold is 99 cores) at block 421. In various embodiments, the host can include a set of assets. Also, the set of assets can include a set of virtual machines. As such, the triggering event may occur when the host becomes too busy (e.g., under-resourced to adequately serve its resident virtual machines).

At block 450, it is determined to perform an event response. The determination is based on a set of profile data. The event response includes initiating a resource action corresponding to a set of dynamically-assigned resources or initiating an asset action corresponding to a set of assets. The determination can include computing/calculating whether to initiate the resource action (e.g., using capacity-on-demand resources) or whether to initiate the asset action (e.g., live migration). As such, both event responses may be considered. In general, the event response may include an operation which addresses/targets the triggering event. Determining can include ascertaining, identifying, resolving, formulating, or computing. Initiating can include starting, instantiating, or beginning in order to execute, perform, run, or carry-out. For instance, initiating the asset action can start a migration operation.

The set of profile data can include various factors (e.g., inputs, values, statistics, data-points, free text) which may be analyzed. For instance, analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use. The set of profile data may be stored/collected in connection with the resource manager such as in a database (e.g., a centralized management apparatus). In certain embodiments, individual hosts may have the set of profile data stored/collected locally (e.g., individual hosts may be narrowly tailored/configured by a cloud administrator). Other hybrid combinations of storage/collection of the set of profile data are also considered.

In embodiments, the set of profile data may be associated with one or more parameters. The parameters can be populated with parameters values. The resource action may be selected in response to the set of profile data indicating a first parameter value for a parameter. The asset action may be selected in response to the set of profile data indicating a second parameter value for the parameter. For example, the parameter may be "AM/PM." If the parameter value for the parameter indicates "AM," then the resource action may be selected/chosen. If the parameter value for the parameter indicates "PM," then the asset action may be selected/chosen. Such selection may also be based on other parameters which can be linked with factors described herein.

In embodiments, the set of profile data includes a temporal factor at block 451. The temporal factor can include months of the year, days of the week, hours of the day, selected minutes of an hour (e.g., top/bottom of the hour), time-frames before/during/after other events, or seasonal elements. For example, peak usage hours may indicate whether to perform a resource action or an asset action. Also, multiple asset actions within a time-frame (e.g., 30 minutes) may be discouraged (e.g., with respect to one host or one virtual machine). During busy-seasons (e.g., spring/fall for corn/soybean farmers), resource actions may be preferred while, during off-seasons (e.g., July/August for ice hockey coaches), asset actions may be favored. Such seasonal natures (or other factors described herein) may be user-provided, be machine-learned, or be gathered from a corpus. As such, in response to the set of profile data indicating to avoid a virtual machine migration during a temporal period, the resource action may be selected (with respect to the temporal period during which to perform the event response). In response to the set of profile data indicating to avoid use of the set of dynamically-assigned resources during the temporal period, the asset action may be selected (with respect to a temporal period during which to perform the event response). Other possible temporal factors are considered.

In embodiments, the set of profile data includes a physical location/geographic/environment factor at block 452. The physical location factor may be related to physical distance between hosts, physical distance between data to be processed, comparative energy usage at different physical locations, etc. For example, an asset action including a virtual machine migration in a data center exclusively in Chicago may be preferred relative to using dynamically-assigned resources. However, if the asset action were to require the virtual machine migration to occur from a first data center in New York to a second data center in San Francisco, using dynamically-assigned resources may be preferred. Similarly, energy usage at a data center near a wind-farm on a windy day in Oklahoma may indicate a preference for an asset action (e.g., conserve dynamically-assigned resources). Whereas with all other aspects the same, energy usage at a data center next to a hospital on a hot day in the center of Los Angeles may indicate a preference for the resource action. Other possible location/geographic/environment factors are considered.

In embodiments, the set of profile data includes an unassigned resource availability factor at block 453. The unassigned resource availability factor may indicate how many dynamically-assigned resources are unassigned to other hosts (e.g., available in a pool). If relatively few mobile resources are available/accessible/gettable, the asset action may be more prone to be initiated. If a relatively large number of mobile resources are available, the resource action may be initiated. Accordingly, in response to the set of profile data indicating an unassigned resource value (with respect to the set of dynamically-assigned resources) exceeds a threshold unassigned resource value, the resource action may be selected. As with the other factors, the unassigned resource availability may be combined or used in conjunction with one or more factors including those described herein.

In embodiments, the set of profile data includes an assigned resource availability factor at block 454. The assigned resource availability factor may indicate how many dynamically-assigned resources are available/accessible/gettable on another host which could be moved/transitioned. Also, the assigned resource availability factor can indicate burdens/costs (and possibly benefits) execute the transition/move. For example, another host may have a surplus of dynamically-assigned resources and can relatively easily donate at least a portion of the surplus (e.g., basically without a burden to the host). To illustrate a greater burden, perhaps another host has a surplus of 1 of its 2 mobile cores. Reducing that host to 1 mobile core may still (barely) meet its utilization needs, but could pose other performance/efficiency potential challenges. A variety of burdens/costs may be considered (e.g., operational costs/burdens of transitioning/moving resources). As such (e.g., with respect to both the set of dynamically-assigned resources and a donor host), in response to the set of profile data indicating an assigned resource value exceeds a target resource value for the donor host, the resource action may be selected.

In embodiments, the set of profile data includes a weighted resource availability factor at block 455. For instance, varying weights may be given to dynamically-assigned resources (e.g., unassigned to hosts, assigned to a first group of hosts, assigned to a second group of hosts). Also, varying weights may be given to virtual machines on different hosts (e.g., a first virtual machine on a first host, a second virtual machine on the first host, a third virtual machine on a second host, a fourth virtual machine on the second host). The weights may be utilized to indicate one or more burdens of transitioning/moving resources or migrating virtual machines (or with respect to particular hosts). For example, migrating the first virtual machine from the first host may have a burden score of 95 out of 100 while migrating the fourth virtual machine from the second host may have a burden score of 15 out of 100. Similarly, moving a mobile core from the first group of hosts may have a burden score of 80 out of 100 while moving a mobile core from the second group of hosts may have a burden score of 35 out of 100. Burdens with respect to both (candidate) resource actions and (candidate) asset actions may be compared/evaluated/assessed. In response to the set of profile data indicating an expected burden of executing the asset action exceeds an expected burden of executing the resource action, the resource action may be selected.

In embodiments, the set of profile data includes an asset priority factor at block 456. For example, certain hosts, certain virtual machines, or certain workloads may have an indicated priority so as to not be impacted be a resource action or an asset action. Others may have an indicated priority to easily enable resource actions or asset actions (e.g., perhaps similar to the weighted resource availability factor). The asset priority factor may have a user-defined/input component. For example with respect to the host, in response to the set of profile data indicating to avoid a virtual machine migration from the host, the resource action may be selected. For instance with respect to a virtual machine on the host, in response to the set of profile data indicating to avoid a virtual machine migration of the virtual machine from the host, the resource action can be selected. In certain embodiments, the priority may not be an absolute priority. To illustrate with respect to a workload of a virtual machine on the host, in response to both the set of profile data indicating to avoid a virtual machine migration of the virtual machine from the host and a determination that the resource action is impractical based on a group of factors (e.g., factors described herein), the asset action may be selected (e.g., migrating the virtual machine nonetheless).

In embodiments, the set of profile data includes an expected performance factor at block 457. The expected performance factor may include a forecast or prediction for performance (e.g., processor utilization) of one or more hosts in response to the event response. For instance, the costs/burdens of performing a migration, downtime, and impact to the virtual machines may be indicated with respect to a prospective asset action. Similarly, various resource utilization indicators may be used for varying arrangements of the set of dynamically-assigned resources. Other possibilities are considered, and the expected performance factor may be used in conjunction with other factors described herein.

In embodiments, the set of profile data includes a historical usage factor at block 458. The historical usage factor may include statistics, results, or other information related to past event responses. For instance, the historical usage factor may indicate that a particular host causes great burdens when migrating virtual machines from it. As another example, a certain workload may respond more favorably to additional mobile cores than to being migrated to another host. The historical usage factors may be environment-wide or specific to certain hosts. In general, the historical usage factors may also provide estimates for costs, burdens, or other event response consequences.

In embodiments, the set of profile data includes a user-provided factor at block 459. The user-provided factor can include information or selections related to various other factors described herein. For example, the user-provided factor may include weights for when to choose/select certain operations. Users may also define their own parameters, and associated parameter values to generate the resulting resource combinations which are preferred. For example, a processor-related resource action may take preference over a virtual machine migration asset action which may take preference over a memory-related resource action. Various possibilities for the user-provided factor are contemplated.

In embodiments, the set of profile data includes a set of user input data and a set of computing environment data at block 460. The set of user input data may be similar to the user-provided factor. The set of user input data can include features related to the computing environment or the shared pool of configurable computing resources that may be challenging for the resource manager to discover on its own (e.g., more processing power or memory is about to be added). The set of computing environment data may include information about the computing environment which is discovered by the resource manager (e.g., hardware, software, operating statistics). The set of computing environment data may include measurements of input-output, bandwidth, or other features.

At block 490, the event response is performed. The event response may be performed to change the resource utilization on the host. Performing the event response can include initiating/executing the resource action, initiating/executing the asset action, or both. In embodiments, the event response (e.g., including initiating/executing the resource action) includes distributing the set of dynamically-assigned resources to the host at block 470. For example, allocating more cores to the host may reduce the resource utilization on the host (e.g., adding 10 mobile cores to a host previously having 10 cores may double the resource capacity and cut the resource utilization in half to a level below the threshold, 9/10=90% while 9/20=45% where the threshold resource utilization may be 50%).

In embodiments, the event response (e.g., including initiating/executing the asset action) includes migrating a set of virtual machines from the host to a new host (e.g., the new host has lesser resource utilization challenges than the host, the overall environment may operate more efficiently, moving the set of virtual machines from the host reduces the load on the host) at block 480. In such embodiments, the event response can include distributing the set of dynamically-assigned resources to the new host (e.g., migrating a virtual machine to the new host and distributing dynamically-assigned resources to the new host to positively impact resource utilization). In certain embodiments, in response to distributing the set of dynamically-assigned resources to, the set of dynamically-assigned resources is activated (e.g., turned-on, made available for use, a restriction/limitation is removed). Activation may occur without disrupting other resources on the host or the new host. The activated set of dynamically-assigned resources can receive jobs, workloads, or tasks in response to activation (e.g., before or with priority relative to other resources on the host or the new host). In certain embodiments, an indication that the second host includes the set of dynamically-assigned resources is recorded in the set of resource assignment data (e.g., coupling in a record a host identifier and a mobile resource identifier for the set of dynamically-assigned resources). In such embodiments, historical data may be recorded to indicate previous locations of dynamically-assigned resources (e.g., coupling in a historical record a first host identifier and the mobile resource identifier for the set of dynamically-assigned resources).

In embodiments, a usage assessment may be generated with respect to the capacity-on-demand technology. Use of the set of dynamically-assigned resources may be metered at block 497. For example, mobile processors/memory allocated may be measured based on factors such as quantity allocated, temporal periods of allocation, actual usage, available usage, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at block 498. The generated invoice may be provided (e.g., displayed in a dialog box, sent or transferred by e-mail, text message, traditional mail) to the user for notification, acknowledgment, or payment.

Method 400 concludes at block 499. Aspects of method 400 may provide performance or efficiency benefits for managing a shared pool of configurable computing resources. For example, aspects of method 400 may have positive impacts when using a set of dynamically-assigned resources with respect to capacity-on-demand technology. Altogether, performance or efficiency benefits for utilization of the set of dynamically-assigned resources may occur (e.g., speed, flexibility, responsiveness, load balancing, availability, resource usage, productivity).

Figure 5:
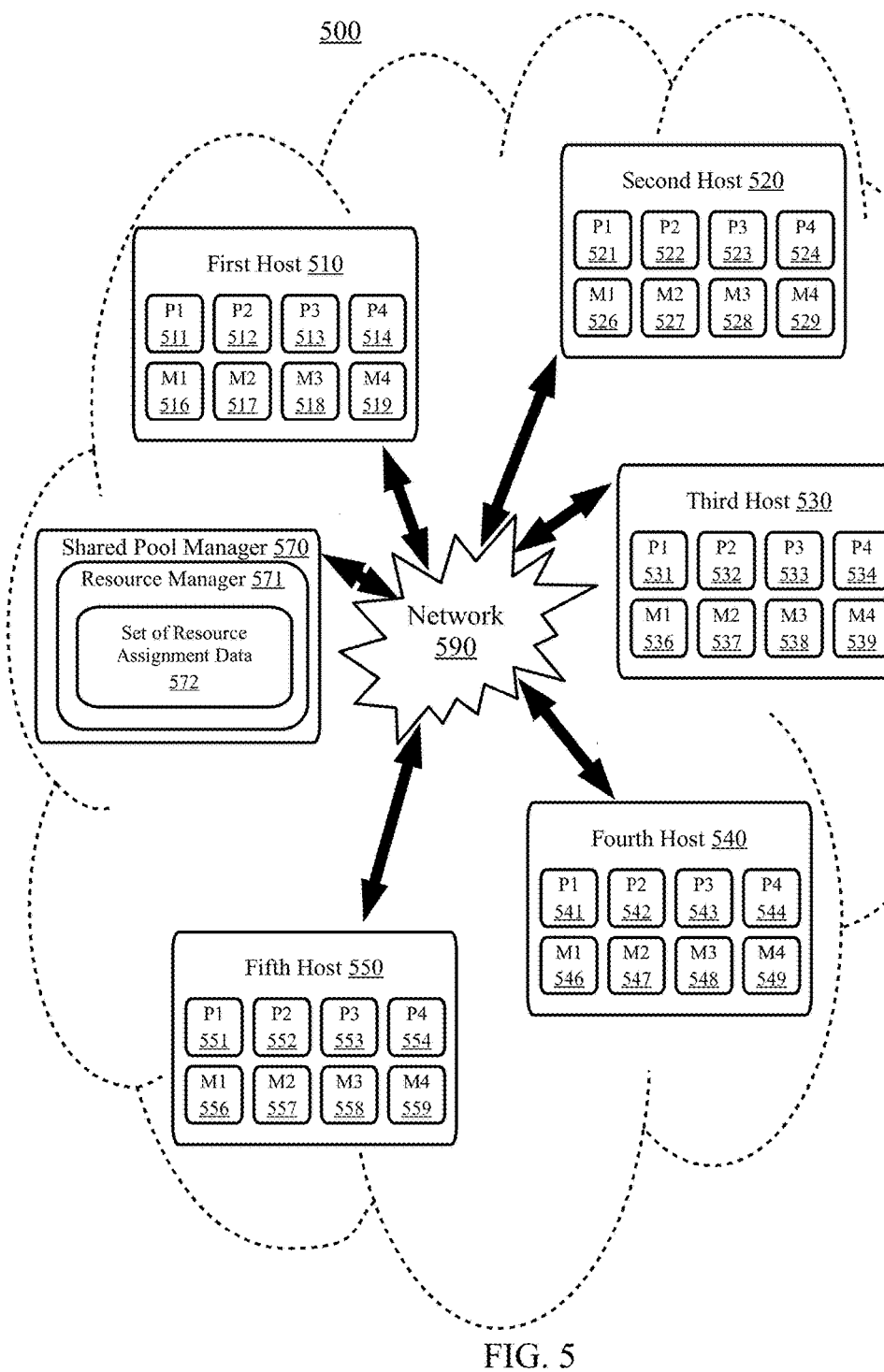
FIG. 5 shows an example system having a shared pool of configurable computing resources which uses a set of dynamically-assigned resources with respect to capacity-on-demand technology according to embodiments.

FIG. 5 shows an example system 500 having a shared pool of configurable computing resources which uses a set of dynamically-assigned resources with respect to capacity-on-demand technology according to embodiments. In embodiments, method 400 may be implemented using aspects described with respect to the example system 500. As such, aspects of the discussion related to FIG. 4 and method 400 may be used or applied in the example system 500. Components depicted in FIG. 5 need not be present, utilized, or located as such in every such similar system, and such components are presented as an illustrative example. Aspects of example system 500 may be implemented in hardware, software or firmware executable on hardware, or a combination thereof. The example system 500 may include the shared pool of configurable computing resources (e.g., the cloud environment). Of course, example system 500 could include many other features or functions known in the art that are not shown in FIG. 5.

A shared pool manager 570 can include a resource manager 571 which has a set of resource assignment data 572. In various embodiments, at least one of the shared pool manager, the resource manager, or the resource assignment data a separate from one another. Such aspects can communicate with a set of hosts via network 590. The first host 510 may include a first set of processors (P1) 511 (e.g., representing 64 processor cores), a second set of processors (P2) 512, a third set of processors (P3) 513, a fourth set of processors (P4) 514, a first set of memory (M1) 516 (e.g., representing 64 memory elements), a second set of memory (M2) 517, a third set of memory (M3) 518, and a fourth set of memory (M4) 519. The second host 520, third host 530, fourth host 540, and fifth host 550 may be configured similarly (e.g., with respect to processors 521, 522, 523, 524, 531, 532, 533, 534, 541, 542, 543, 544, 551, 552, 553, 554 and memory 526, 527, 528, 529, 536, 537, 538, 539, 546, 547, 548, 549, 556, 557, 558, 559).

Capacity-on-demand technology allows hosts to have compute resources (e.g., processors, memory) dynamically activated (e.g., for efficiency of license costs). Consider example system 500 having 256 physical cores per host. However, a user's typical operational load may only generally require 500 of those cores active. As such, the user only licenses the system to run 500 cores which saves licensing fees associated with the remaining 156 cores per host (or 780 in total).

Based on historical information (e.g., past experience), a user may desire to account for peak temporal periods in the user's environment where the user requires additional processor capacity to meet workload demands. However, that extra capacity does not always need to be activated. As such, capacity-on-demand technology may be applied. Mobile cores (e.g., dynamically-assigned processors) may be utilized/purchased. The mobile cores can be dynamically-assigned one or more hosts. For example, the user may implement a group of 320 mobile core licenses. The group can be spread across the user's hosts in a user-defined manner. As such, benefits/savings may result compared to having to permanently license all of these cores (because they are rarely all needed at once). Also, the mobile cores may be assigned according to predetermined or user-defined methodologies (e.g., 50 to the first host, 108 to the second host, 108 to the third host, and 54 to the fourth host).

In cloud management solutions, ongoing performance impact operations can be enabled to keep the resources across a group of hosts in the cloud environment balanced. For example, if processor utilization reaches a predefined threshold on a host, virtual machines may be migrated off of the original host to another host until the processor utilization is below the threshold on the original host. Defining which resources are kept in balance and how the balancing occurs may be made customizable to a user. Example configurable features include which hosts to keep in balance, the frequency at which to monitor the hosts, and various thresholds at which resources may be considered out of balance. Aspects of the disclosure may have performance or efficiency benefits on resource utilization by using a policy-driven methodology to resolve when to distribute/activate dynamically-assigned resources to positively impact resource utilization and when to migrate virtual machines off of the host to positively impact resource utilization (e.g., using a set of profile data).

In embodiments, a policy-based approach described herein uses various factors. A temporal factor can include a time of day (e.g., during off-peak hours live migrations may be used regardless of temporal burden in order to conserve our dynamically-assigned resources for peak hours). An unassigned resource availability factor can include an amount of dynamically-assigned resources which are available in a pool (e.g., unassigned to other hosts). An assigned resource availability factor can include an amount of dynamically-assigned resources which are available on another host that could be moved. Costs/burdens of executing the move/transition may be accounted-for, computed, or weighted. An asset priority factor can use availability requirements of workloads being run (e.g., on higher-priority workloads, a user/administrator may provide a parameter value so as to not to subject it to potential errors due to live migration and provide a preference for capacity-on-demand activation so as to favor using dynamically-assigned resources but allow live migration if such a resource action presents various challenges, is impractical, or is impossible. An expected performance factor may indicate the cost/burden of performing a migration, downtime, and impact to the virtual machine.

Disclosed aspects use statistics collection such as daemon tasks collecting network utilization using nicstat or comparable tooling to collect network utilization information, application program interfaces with respect to capacity-on-demand support to retrieve available mobile resources or properties/tags with respect to virtual machines (e.g., availability requirements, workload priority/importance). A costing model can be used to determine the cost of performing migration in order to free up the required resources.

Disclosed aspects enable a cloud administrator to define policies which may be used for operations described herein. Calculations may be made which positively impact the usage of units of dynamically-assigned resources by virtual machines with higher availability priority, while also positively impacting migration burdens (e.g., by considering constraints for temporal periods in which migrations are allowed). As such, linear programming can be used to perform such calculations; however, other approaches are possible. Altogether, aspects may have performance or efficiency benefits relative to x86 systems, relative to always migrating a virtual machine, or relative to technologies which utilize a human interface for detecting the triggering event, determining the perform the event response based on the set of profile data, or performing the event response.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for managing a shared pool of configurable computing resources, the system comprising:
    a memory having a set of computer readable computer instructions, and
    a processor for executing the set of computer readable instructions, the set of computer readable instructions including:
    detecting a triggering event related to a resource utilization on a host of the shared pool of configurable computing resources;
    determining, based on a set of profile data, to perform an event response which is selected from a group consisting of at least one of:
        selecting, with respect to a temporal period during which to perform the event response, a resource action in response to the set of profile data indicating to avoid a first virtual machine migration during the temporal period,
        selecting, with respect to the temporal period during which to perform the event response, an asset action in response to the set of profile data indicating to avoid use of a set of dynamically-assigned resources during the temporal period,
        selecting, with respect to a workload of a virtual machine on the host, the asset action in response to both: the set of profile data indicating to avoid a second virtual machine migration of the virtual machine from the host, and a determination that the resource action is impractical based on a group of factors,
        selecting, with respect to both the set of dynamically-assigned resources and a donor host, the resource action in response to the set of profile data indicating an assigned resource value exceeds a target resource value for the donor host, and
        selecting, with respect to the resource action and the asset action, the resource action in response to the set of profile data indicating an expected burden of executing the asset action exceeds an expected burden of executing the resource action; and
    performing the event response to change the resource utilization on the host.

2. The system of claim 1, wherein:
    the triggering event includes the resource utilization exceeding a threshold resource utilization;
    the host includes a set of assets;
    the set of assets include a set of virtual machines;

an x86 processor is absent with respect to the set of dynamically-assigned resources; and detecting, determining, and performing each occur in an automated fashion without user intervention.

3. The system of claim 1, wherein the event response includes distributing the set of dynamically-assigned resources to the host.

4. The system of claim 1, wherein the event response includes migrating a set of virtual machines from the host to a new host.

5. The system of claim 1, wherein determining, based on the set of profile data, to perform the event response includes:
   computing whether to initiate the resource action or whether to initiate the asset action.

6. The system of claim 1, wherein the set of profile data includes a selection from a group consisting of at least one of:
   a temporal factor;
   a physical location factor;
   an unassigned resource availability factor;
   an assigned resource availability factor;
   a weighted resource availability factor;
   an asset priority factor;
   an expected performance factor;
   a historical usage factor; and
   a user-provided factor.

7. The system of claim 1, wherein the set of profile data includes both:
   a set of user input data, and
   a set of computing environment data.

8. The system of claim 1, wherein determining, based on the set of profile data, to perform the event response includes:
   selecting the resource action in response to the set of profile data indicating a first parameter value for a parameter, and
   selecting the asset action in response to the set of profile data indicating a second parameter value for the parameter.

9. The system of claim 1, wherein determining, based on the set of profile data, to perform the event response includes:
   selecting, with respect to the host, the resource action in response to the set of profile data indicating to avoid a third virtual machine migration from the host.

10. The system of claim 1, wherein determining, based on the set of profile data, to perform the event response includes:
    selecting, with respect to a virtual machine on the host, the resource action in response to the set of profile data indicating to avoid a fourth virtual machine migration of the virtual machine from the host.

11. The system of claim 1, wherein determining, based on the set of profile data, to perform the event response includes:
    selecting, with respect to the set of dynamically-assigned resources, the resource action in response to the set of profile data indicating an unassigned resource value exceeds a threshold unassigned resource value.

12. The system of claim 1, further comprising:
    metering use of the event response; and
    generating an invoice based on the metered use.

13. A computer program product for managing a shared pool of configurable computing resources, the computer program product comprising a computer readable storage medium having program instructions embodied therewith, wherein the computer readable storage medium is not a transitory signal per se, the program instructions executable by a processor to cause the processor to perform a method comprising:
    detecting a triggering event related to a resource utilization on a host of the shared pool of configurable computing resources;
    determining, based on a set of profile data, to perform an event response which is selected from a group consisting of at least one of:
       selecting, with respect to a temporal period during which to perform the event response, a resource action in response to the set of profile data indicating to avoid a first virtual machine migration during the temporal period,
       selecting, with respect to the temporal period during which to perform the event response, an asset action in response to the set of profile data indicating to avoid use of a set of dynamically-assigned resources during the temporal period,
       selecting, with respect to a workload of a virtual machine on the host, the asset action in response to both: the set of profile data indicating to avoid a second virtual machine migration of the virtual machine from the host, and a determination that the resource action is impractical based on a group of factors,
       selecting, with respect to both the set of dynamically-assigned resources and a donor host, the resource action in response to the set of profile data indicating an assigned resource value exceeds a target resource value for the donor host, and
       selecting, with respect to the resource action and the asset action, the resource action in response to the set of profile data indicating an expected burden of executing the asset action exceeds an expected burden of executing the resource action; and
    performing the event response to change the resource utilization on the host.

14. The computer program product of claim 13, wherein at least one of:
    the program instructions are stored in the computer readable storage medium in a data processing system, and wherein the program instructions were downloaded over a network from a remote data processing system; or
    the program instructions are stored in the computer readable storage medium in a server data processing system, and wherein the program instructions are downloaded over a network to the remote data processing system for use in a second computer readable storage medium with the remote data processing system.

15. A system for managing a shared pool of configurable computing resources, the system comprising:
    a memory having a set of computer readable computer instructions, and
    a processor for executing the set of computer readable instructions, the set of computer readable instructions including:
    detecting a triggering event related to a resource utilization on a host of the shared pool of configurable computing resources;
    determining, based on a set of profile data, to perform an event response which includes:
       selecting, with respect to a resource action and an asset action, the asset action in response to the set of profile data indicating an expected burden of executing the resource action exceeds an expected burden of executing the asset action; and performing the event response to change the resource utilization on the host.

* * * * *